(12) United States Patent
Toyoshima

(10) Patent No.: US 7,460,853 B2
(45) Date of Patent: Dec. 2, 2008

(54) WIRELESS MODULE SECURITY SYSTEM AND METHOD

(75) Inventor: Akihiko Toyoshima, Tokyo (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1077 days.

(21) Appl. No.: 09/972,183

(22) Filed: Oct. 5, 2001

(65) Prior Publication Data

US 2002/0081993 A1    Jun. 27, 2002

Related U.S. Application Data

(60) Provisional application No. 60/240,011, filed on Oct. 13, 2000.

(51) Int. Cl.
*H04M 1/66* (2006.01)

(52) U.S. Cl. ............ 455/410; 455/411; 455/419; 455/566.1; 455/557; 726/35; 711/164; 340/5.54; 340/5.85

(58) Field of Classification Search ......... 455/410–411, 455/419, 557; 380/247, 249; 379/903; 340/5.54, 340/5.85; 711/164; 713/202; 726/35
See application file for complete search history.

(56) References Cited

U.S. PATENT DOCUMENTS

| | | | | |
|---|---|---|---|---|
| 4,593,155 | A | | 6/1986 | Hawkins ............... 455/411 |
| 4,908,848 | A | | 3/1990 | Hanawa ............... 455/565 |
| 5,036,532 | A | | 7/1991 | Metroka et al. ............ 455/566 |
| 5,109,403 | A | | 4/1992 | Sutphin ............... 455/419 |
| 5,243,653 | A | * | 9/1993 | Malek et al. ............ 380/272 |
| 5,294,792 | A | | 3/1994 | Lewis et al. ............ 250/221 |
| 5,297,192 | A | | 3/1994 | Gerszberg ............ 455/419 |
| 5,398,285 | A | * | 3/1995 | Borgelt et al. ............ 380/30 |
| 5,781,723 | A | | 7/1998 | Yee et al. ............ 713/200 |
| 5,790,800 | A | * | 8/1998 | Gauvin et al. ............ 709/227 |
| 5,884,195 | A | | 3/1999 | Gomez et al. ............ 455/572 |
| 5,893,037 | A | | 4/1999 | Reele et al. ............ 455/556.1 |
| 5,936,887 | A | | 8/1999 | Choi et al. ............ 365/185.17 |

(Continued)

OTHER PUBLICATIONS

U.S. Appl. No. 09/976,455, filed Oct. 11, 2001, Toyoshima.

*Primary Examiner*—George Eng
*Assistant Examiner*—Marcos L Torres
(74) *Attorney, Agent, or Firm*—John L. Rogitz

(57) ABSTRACT

A wireless module security system and method is provided which includes, in one embodiment providing security data to a wireless module. The security data including a security code provided to the wireless module after the wireless module has been activated. The method for providing the security code includes encrypting the security code after establishing a wireless module account, issuing the security code through wireless transmission to the wireless module, and decrypting and storing the security code inside the wireless module. The security system and method also utilizes user authorized associated peripheral devices which may be connected to the wireless module to provide further combinations of security data. In one embodiment, the wireless module is provided with an electronic serial number and that electronic serial number is stored to the peripheral device for a security measure. In another embodiment, the peripheral device is provided with peripheral device data and that peripheral device data is stored inside the wireless module for a further security measure. The wireless module is removably connected to any number of user authorized peripheral devices, and thus the wireless module security system and method is provided upon wireless module and peripheral device initialization.

2 Claims, 4 Drawing Sheets

U.S. PATENT DOCUMENTS

| | | | | |
|---|---|---|---|---|
| 5,964,830 A * | 10/1999 | Durrett | | 709/200 |
| 6,078,806 A | 6/2000 | Heinonen et al. | | 455/406 |
| 6,078,908 A * | 6/2000 | Schmitz | | 705/50 |
| 6,091,956 A | 7/2000 | Hollenberg | | 455/456.5 |
| 6,108,727 A | 8/2000 | Boals et al. | | 710/68 |
| 6,128,389 A * | 10/2000 | Chan et al. | | 380/247 |
| 6,137,473 A | 10/2000 | Cortopassi et al. | | 345/156 |
| 6,198,479 B1 | 3/2001 | Humpleman et al. | | 345/329 |
| 6,279,153 B1 | 8/2001 | Bi et al. | | 717/171 |
| 6,330,975 B1 | 12/2001 | Bunte et al. | | 235/472.01 |
| 6,366,487 B1 | 4/2002 | Yeom | | 365/52 |
| 6,421,325 B1 * | 7/2002 | Kikinis | | 370/280 |
| 6,424,827 B1 * | 7/2002 | McGregor et al. | | 455/411 |
| 6,445,914 B1 * | 9/2002 | Findikli et al. | | 455/411 |
| 6,473,609 B1 | 10/2002 | Schwartz et al. | | 455/406 |
| 6,532,370 B1 | 3/2003 | Underbrink et al. | | 455/552.1 |
| 6,615,057 B1 * | 9/2003 | Pettersson | | 455/558 |
| 6,628,934 B2 * | 9/2003 | Rosenberg et al. | | 455/411 |
| 6,662,023 B1 * | 12/2003 | Helle | | 455/558 |
| 6,684,084 B1 * | 1/2004 | Phillips | | 455/558 |
| 6,694,430 B1 | 2/2004 | Zegelin et al. | | 713/160 |
| 6,696,919 B1 * | 2/2004 | Leickel et al. | | 340/5.74 |
| 6,728,531 B1 | 4/2004 | Lee et al. | | 455/419 |
| 6,788,332 B1 | 9/2004 | Cook | | 348/14.02 |
| 6,804,730 B1 * | 10/2004 | Kawashima | | 710/36 |
| 6,871,063 B1 * | 3/2005 | Schiffer | | 455/410 |
| 2002/0012329 A1 | 1/2002 | Atkinson et al. | | 370/330 |
| 2002/0056142 A1 | 5/2002 | Redmond | | 725/151 |
| 2002/0080741 A1 | 6/2002 | Toyoshima | | |
| 2002/0081993 A1 | 6/2002 | Toyoshima | | |
| 2002/0082048 A1 | 6/2002 | Toyoshima | | |
| 2002/0085530 A1 | 7/2002 | Toyoshima | | |
| 2002/0087759 A1 | 7/2002 | Toyoshima | | |
| 2002/0174190 A1 | 11/2002 | Toyoshima | | |

* cited by examiner

WIRELESS MODULE SECURITY SYSTEM AND METHOD

This application incorporates herein by reference U.S. patent application Ser. No. 09/972,761, now U.S. Pat. No. 7,020,118, filed Oct. 5, 2001; U.S. patent application Ser. No. 09/976,455, now U.S. Pat. No. 7,230,939, filed Oct. 11, 2001; U.S. patent application Ser. No. 09/972,760, filed Oct. 5, 2001; U.S. patent application Ser. No.09/974,724, filed Oct. 9, 2001; U.S. patent application Ser. No. 09/974,724, filed Oct. 9, 2001; U.S. patent application Ser. No. 09/977,080, now U.S. Pat. No. 6,907,456, filed Oct. 21, 2001; and U.S. patent application Ser. No. 09/972,781, filed Oct. 5, 2001; and U.S. patent application Ser. No. 09/928,582, of Baranowski, et al., for WIRELESS MODULE, filed Aug. 13, 2001; and Provisional patent application Ser. No. 60/240,011; of Juan, et al., for PORTABLE WIRELESS MODEM, filed Oct. 13, 2000, the benefit of whose priority date is hereby claimed.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates generally to the field of removable data storage devices. More particularly, this invention relates to a security system and method for a data storage and wireless transmission module.

BACKGROUND OF THE INVENTION

The need for portability of data has increased over the years, and has spurred the development of removable memory devices. For example, Memory Stick™ is a removable data storage device made by Sony Corporation and is a recordable integrated circuit (IC) digital storage device having a storage capacity greater than a standard 3.5 inch floppy disk. Most importantly, Memory Stick™ is smaller than a stick of gum, very lightweight, and therefore ultra-portable. However, the need for accessability to people, information, and data has also increased and spurred the creation of an ultra-portable accessability device.

A wireless module which provides accessibility and portability to peripheral devices without increasing their cost or exceeding their related space limitations is so provided in a co-pending patent application Ser. No. 09/972,761, now U.S. Pat. No. 7,020,118, filed Oct. 5, 2001; and U.S. patent application Ser. No. 09/928,582, of Baranowski, et al.; for WIRELESS MODULE, filed Aug. 13, 2001 (Sony IPD 50N 3390). In these co-pending patent applications, the wireless module described can be shared with any type of peripheral device which supports such an interface. If the wireless module described is lost or stolen, it could be easily used for illegal purposes and for the perpetration of any crime.

SUMMARY OF THE INVENTION

In view of the foregoing, a security system for a wireless module is provided to prevent the unauthorized and illegal use of the wireless module.

In particular, the wireless module, in one embodiment is provided with security data. In one embodiment, the security data is stored to the wireless module and is provided to the user of the wireless module during initialization and establishment of a wireless module account with an activation center. In another embodiment, the security data is provided to any number of peripheral devices which utilize the removable wireless module. In a further embodiment, the security data along with a complete electronic serial number (ESN) is provided to any number of peripheral devices which utilize the wireless module for a further security measure. In yet another embodiment, the wireless module obtains and stores peripheral device data from the peripheral devices which are provided with the security data.

These and other features and advantages of the invention will be understood upon the consideration of the following detailed description of the invention and accompanying drawings. The features of the invention believed to be novel are set forth with particularity in the appended claims. The invention itself however, both as to organization and method of operation, together with further objects and advantages thereof, may be best understood by reference to the following description taken in conjunction with the accompanying drawing.

BRIEF DESCRIPTION OF THE DRAWING

The following detailed description, given by way of example, and not intended to limit the present invention solely thereto, will best be understood in conjunction with the accompanying drawings in which.

DETAILED DESCRIPTION OF THE INVENTION

While the present invention has been particularly shown and described with reference to an embodiment(s), it will be understood that various changes and modifications may be made without departing from the spirit and scope of this invention. It is intended that the appended claims be interpreted to cover the embodiments described herein and all equivalents thereto.

Figure 1:
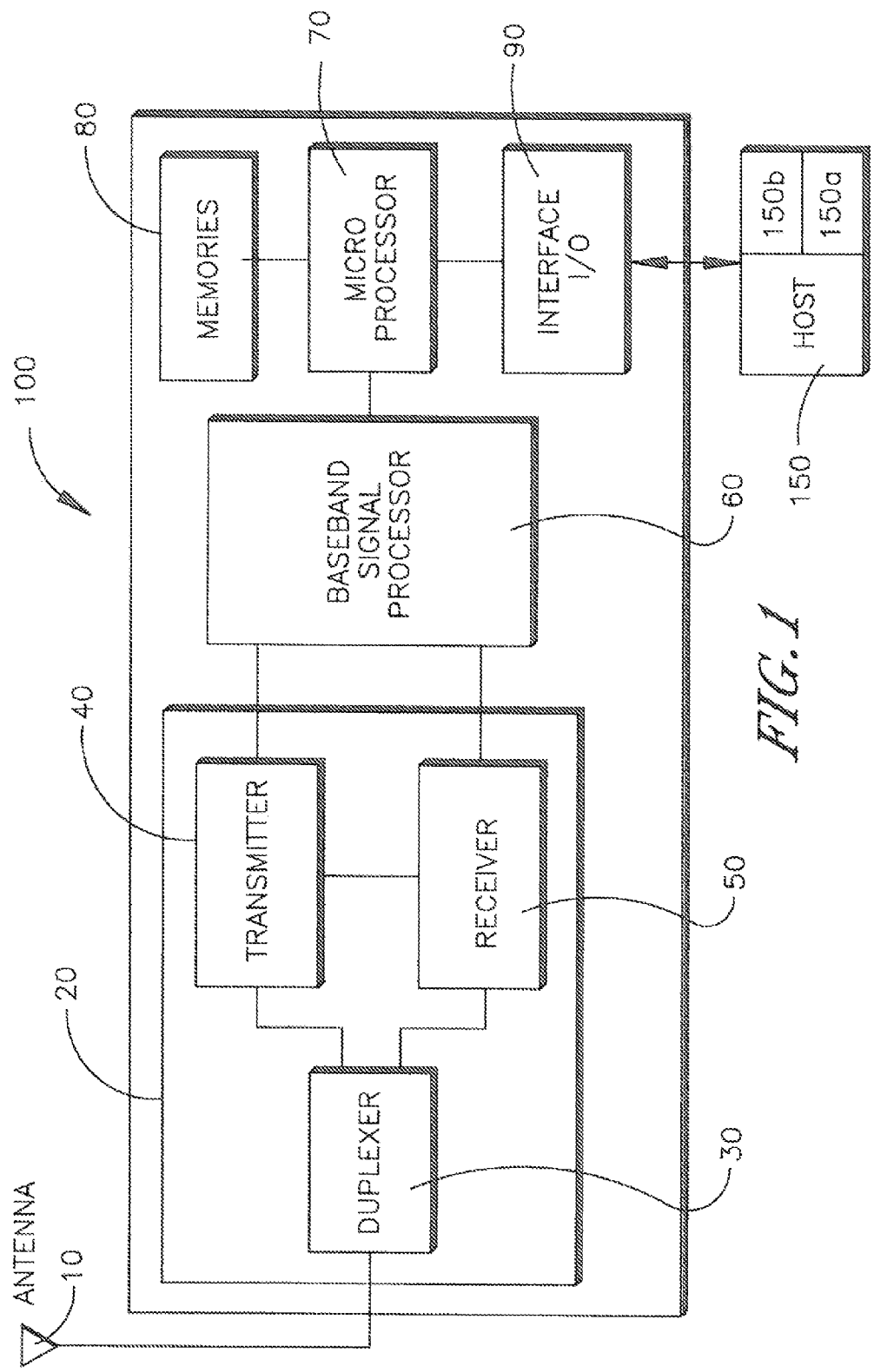
FIG. 1 is a block diagram of one embodiment of a wireless module.

FIG. 1 depicts one embodiment of a wireless module 100 which includes an antenna 10 connected to a transceiver circuit 20. Transceiver circuit 20 includes a duplexer 30, a transmitter 40, and a receiver 50. Transmitter 40 and receiver 50 of transceiver circuit 20 are connected to a baseband signal processor circuit 60. Baseband signal processor circuit 60 is connected to a microprocessor 70. Memories 80 and an interface input/output (I/O) 90 are also connected to microprocessor 70. A host or peripheral unit/device 150 is connected to wireless module 200 through interface I/O 90.

In operation, wireless module 100 receives a signal(s) containing data packets through antenna 10 and forwards the received signals and data packets to duplexer 30, through receiver 50, and to baseband signal processor circuit 60. The data packets/received signals will then be forwarded to microprocessor 70 and through interface I/O 90 to peripheral device/host 150. For example, host/peripheral device 150 may be a PC, laptop, PDA, wireless telephone, or any other type of device or unit which can handle the data packets/received signals. Wireless module 100 receives and transmits data packets/received signals utilizing at least one wireless format selected from the group consisting of CDMA ONE, CDMA 2000 1x, CDMA 2000 3x, CDMA 1x EV, Wideband CDMA, GSM, GPRS and EDGE. In case peripheral device/host 150 engages in simultaneous transmission and reception of data packets, duplexer 30 and memories 80 are utilized.

Because the peripheral device/host 150 may be a PDA, laptop computer, PC, etc. those skilled in the art will readily appreciate that it includes an input device, such as a keypad or keyboard 150a, and an output device, such as a visual display 150b.

Figure 2:
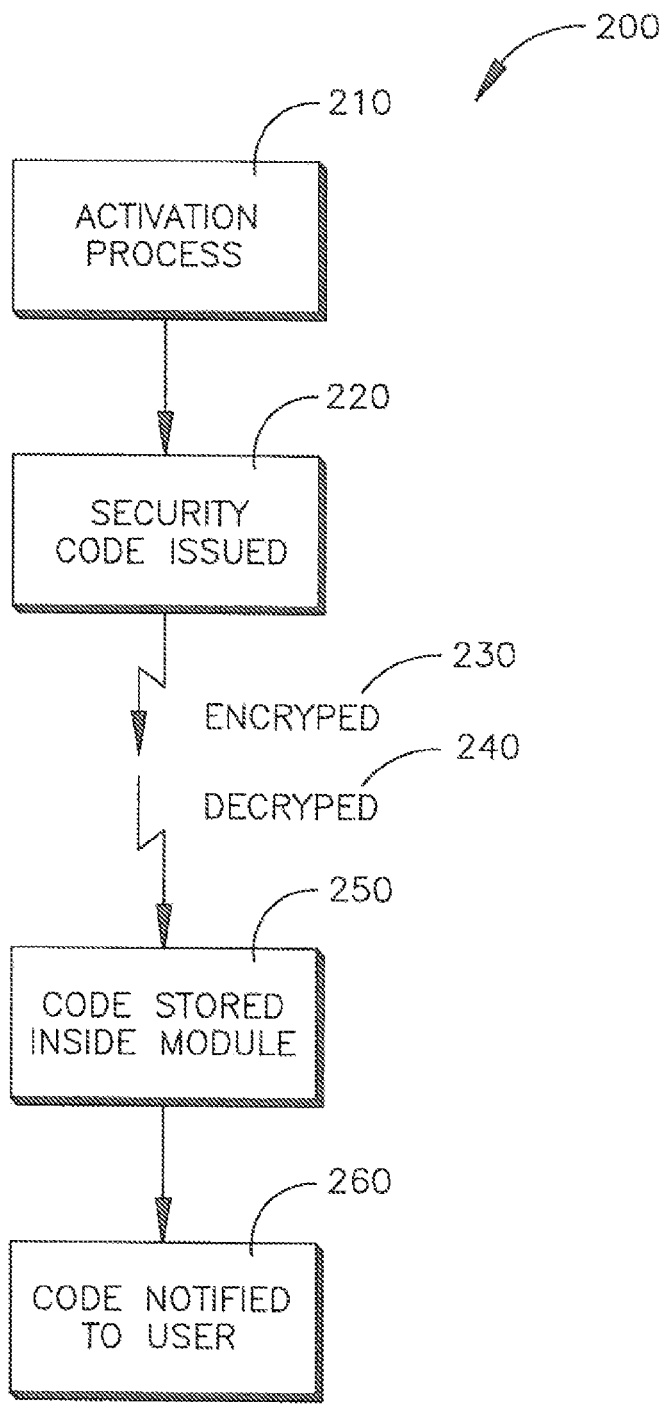
FIG. 2 is a flow diagram illustrating the steps of one embodiment of a method for providing security to the wireless module.

FIG. 2 shows a flow diagram 200 illustrating the steps of one embodiment of a method for providing security to wireless module 100 (shown in FIG. 1). The first step of the method for providing security to wireless module 100 includes an activation process 210 after which security data (not shown) is provided to wireless module 100. In one embodiment, the security data includes a security code (not shown). Step 220 illustrates the issuing of the security code after wireless module 100 has been activated. Flow diagram 200 further illustrates the encrypting of the security code in step 230 prior to issuing the security code through wireless transmission to wireless module 100 and decrypting the security code in step 240 prior to storing the security code.

Step 250 illustrates one embodiment of the method for providing security to wireless module 100 by storing the security code inside wireless module 100. Flow diagram 200 illustrates the conclusion to one embodiment of the method for providing security to wireless module 100 by step 260 where the security code is notified to a user (not shown). In another embodiment, the method for providing security to wireless module 100 provides that the security code is also stored inside/to a peripheral device (not shown). When the security code is also stored inside the peripheral device, step 260 may be eliminated.

Figure 3:
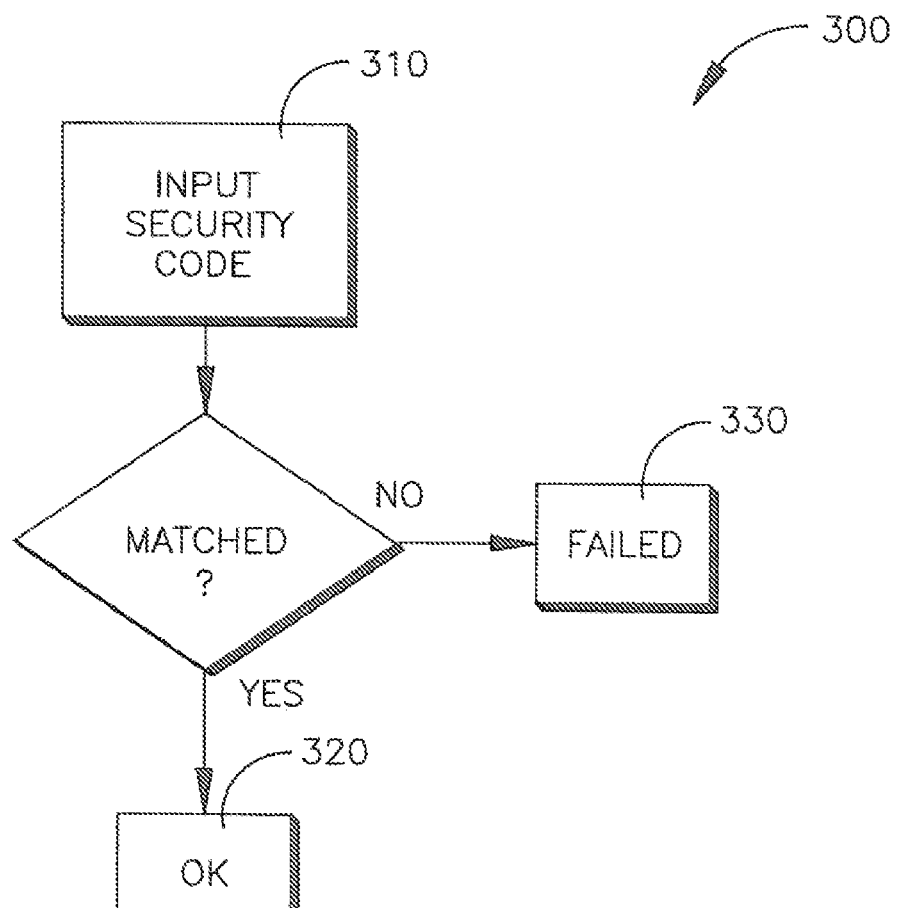
FIG. 3 is a flow diagram illustrating the steps of one embodiment of a method for providing security to the wireless module by matching security data.

FIG. 3 shows a flow diagram 300 illustrating the steps of one embodiment of a method for providing security to wireless module 100 (shown in FIG. 1) by matching security data. Once the user of the peripheral device is notified of the security code, step 310 requires the user to input the security code into the peripheral device in order to have authorized access for the utilization of wireless module 100. If the security code input by the user into the peripheral device matches the security code stored in wireless module 100 then step 320 illustrates that authorized access for the utilization of wireless module 100 is granted. If the security code input by the user into the peripheral device does not match the security code stored in wireless module 100 then step 330 illustrates that the process for authorized access for the utilization of wireless module 100 fails and access is not granted. In another embodiment, the security code is also stored inside the peripheral device so that once the wireless module 100 is in electronic data communication with the peripheral device the separately stored security codes may be automatically compared and the user's input not required, as a further option.

Figure 4:
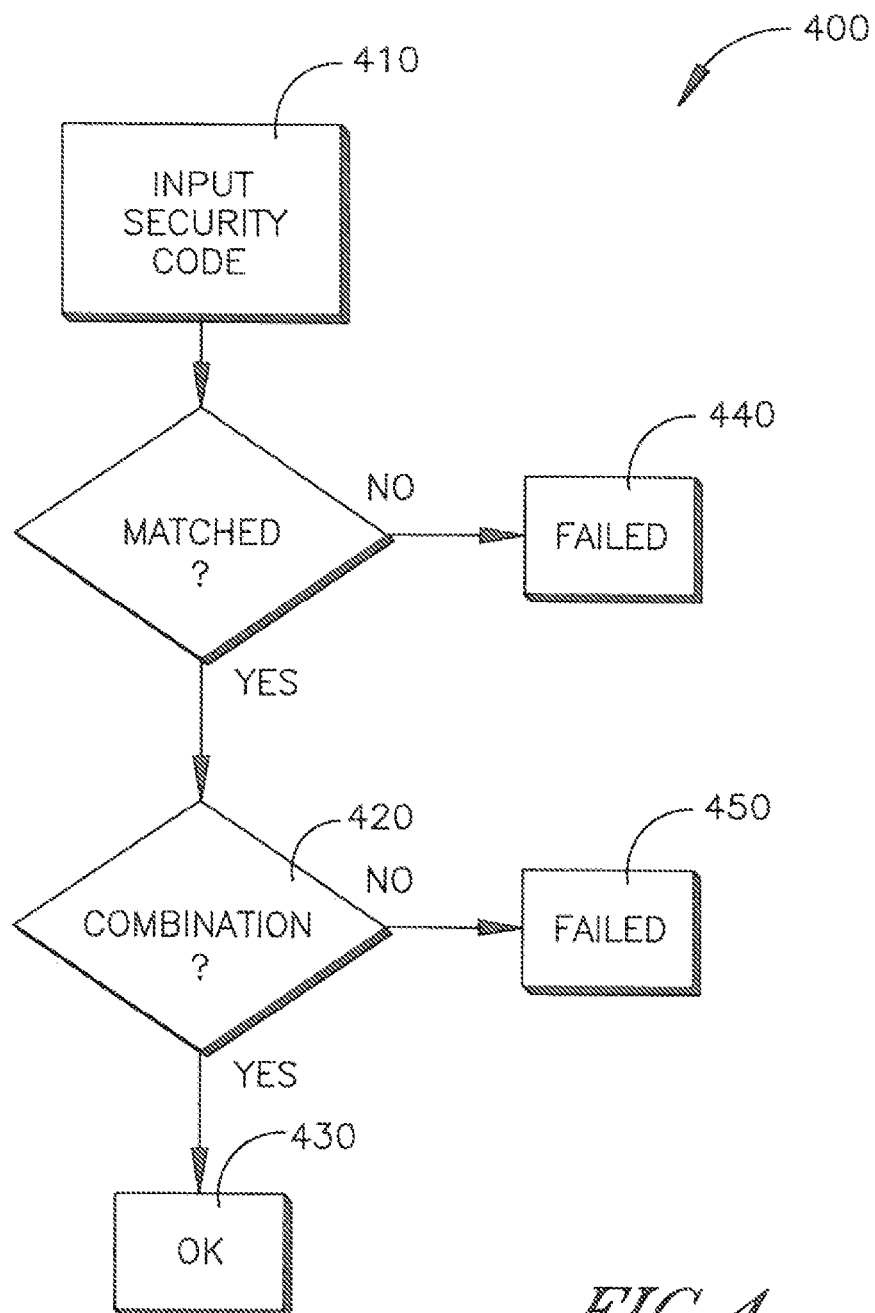
FIG. 4 is a flow diagram illustrating the steps of another embodiment of a method for providing security to the wireless module by matching some combination of security data.

FIG. 4 shows a flow diagram 400 illustrating the steps of another embodiment of a method for providing security to wireless module 100 (shown in FIG. 1) by matching some combination of security data. In another embodiment, wireless module 100 is provided with a complete electronic serial number (not shown) which is stored inside the peripheral device as a security measure. Once the user of the peripheral device is notified of the security code, step 410 requires the user to input the security code into the peripheral device in order to have authorized access for the utilization of wireless module 100. If the security code input by the user into the peripheral device matches the security code stored in wireless module 100 then step 420 illustrates that a further security combination process is performed. If the electronic serial number stored in the peripheral device matches the electronic serial number of wireless module 100 then step 430 illustrates that the process for authorized access for the utilization of wireless module 100 is granted. However, if the security code input by the user into the peripheral device does not match the security code stored in wireless module 100 then step 440 illustrates that the process for authorized access for the utilization of wireless module 100 fails and no further step is taken.

Flow diagram 400 illustrates the conclusion to another embodiment of the method for providing security to wireless module 100 by step 450 where the electronic serial number stored in the peripheral device does not match the electronic serial number of wireless module 100, then the process for authorized access for the utilization of wireless module 100 fails and access is not granted. In a further embodiment, the method for providing security to wireless module 100 by matching some combination of security data provides the peripheral device with peripheral device data (not shown) and stores the peripheral device data to wireless module 100. When the peripheral device data is also stored inside wireless module 100, step 420 may be further extended such that once the electronic serial number stored in the peripheral device matches the electronic serial number of wireless module 100 and the peripheral device data stored in wireless module 100 matches the peripheral device data of the peripheral device, then step 430 illustrates that the process for authorized access for the utilization of wireless module 100 is granted.

In yet another embodiment, the security code is also stored inside the peripheral device so that once the wireless module 100 is in electronic data communication with the peripheral device the separately stored security codes may be automatically compared and the user's input not required which eliminates step 410 and triggers automatic security combination process as illustrated by step 420, as a further option which may be specified by the user.

In order to provide security to wireless module 100, a wireless module activation server (not shown) includes at least one user activation web site (not shown) utilized to transmit security data during the activation process (not shown). The wireless module activation server may also be utilized to automatically and/or remotely activate and deactivate wireless module 100 in the event of a loss, theft, or a failure of any one of the methods for providing security to wireless module 100. The user activation web site is in electronic data communication with wireless module 100 and the peripheral device, and may also store the security data in connection to a wireless module account (not shown).

Wireless module 100 may store any embodiment of the security data to any number of user authorized peripheral devices.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A system for rendering difficult the use of a wireless module with an unauthorized peripheral device, comprising:
   at least one wireless module including a wireless transceiver, the wireless module including at least one security code;
   at least one peripheral device having an input device and a display and communicating with the wireless module only if a human user provides the security code to the peripheral device and the security code provided to the peripheral device matches the security code provided to the wireless module, the peripheral device being a portable computing device, the wireless module being removably engageable with the peripheral device; and
   using a server to deactivate the wireless module in the event that die wireless module is lost and/or stolen.

2. A method for ensuring that a wireless module can communicate only with authorized peripheral devices having input devices and displays, comprising:
   storing a security code in the wireless module;
   removably engaging the wireless module with a peripheral device;
   providing the security code to the peripheral device;
   permitting the peripheral device to access data on the wireless module only if it is determined that the security code provided to the peripheral device matches the security code provided to the wireless module; and
   deactivating the wireless module using a server in the event that the wireless module is lost and/or stolen.

* * * * *